April 7, 1925.

H. N. ATWOOD ET AL 1,532,725

LAMINATED LANDING WHEEL OR THE LIKE

Filed Dec. 24, 1920   3 Sheets-Sheet 1

Inventor
H. N. Atwood.
G. B. Bains. 3rd.

By Lacy & Lacy, Attorneys

April 7, 1925.  1,532,725
H. N. ATWOOD ET AL
LAMINATED LANDING WHEEL OR THE LIKE
Filed Dec. 24, 1920   3 Sheets-Sheet 2
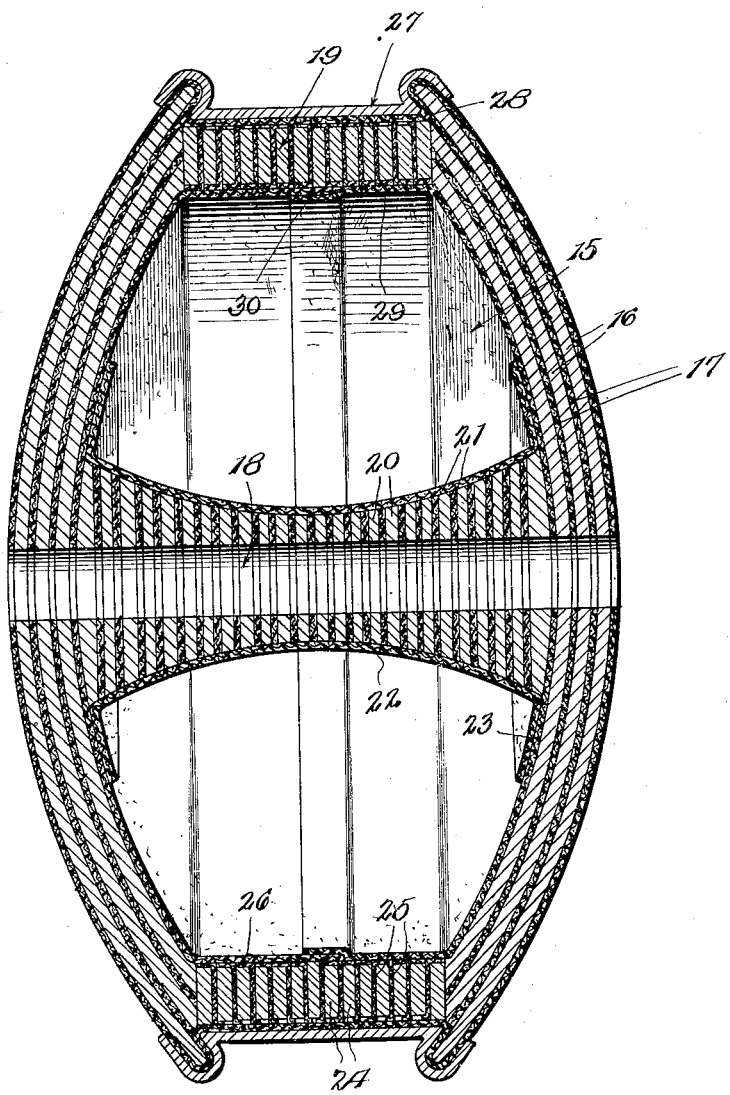
Inventors
H. N. Atwood,
G. B. Bains, 3rd.
By Lacy & Lacy, Attorneys

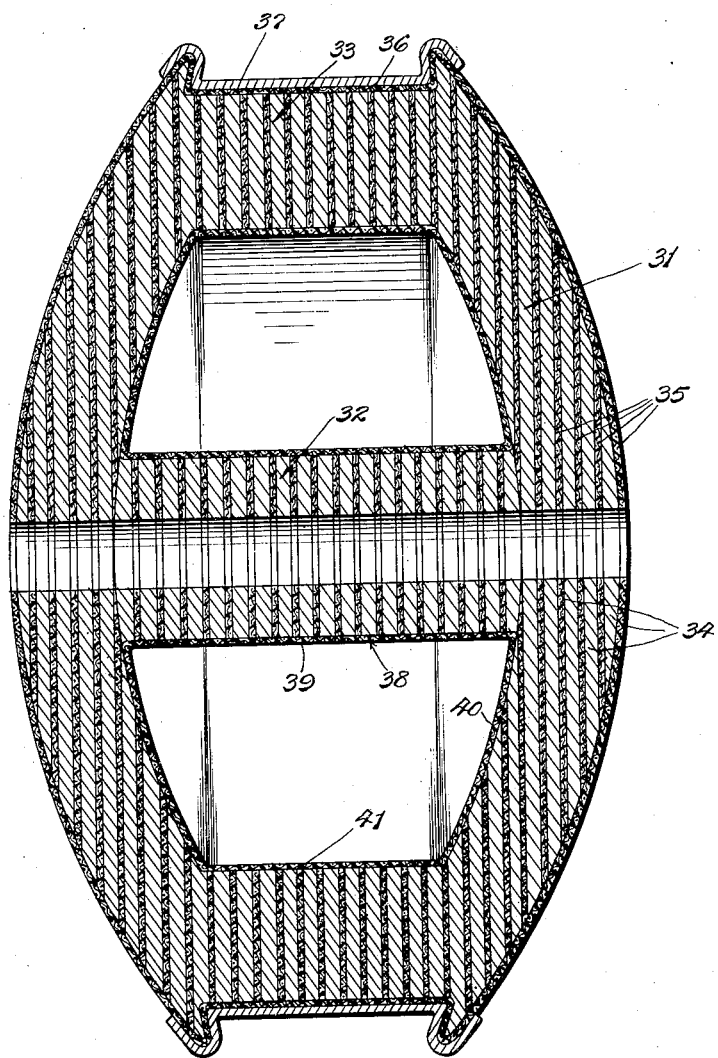

Patented Apr. 7, 1925.

1,532,725

UNITED STATES PATENT OFFICE.

HARRY N. ATWOOD AND GEORGE B. BAINS, 3D, OF READING, PENNSYLVANIA, ASSIGNORS, BY DIRECT AND MESNE ASSIGNMENTS, TO RUBWOOD INC., OF LAWRENCE, MASSACHUSETTS, A CORPORATION OF MASSACHUSETTS.

LAMINATED LANDING WHEEL OR THE LIKE.

Application filed December 24, 1920. Serial No. 432,940.

*To all whom it may concern:*

Be it known that we, HARRY N. ATWOOD and GEORGE B. BAINS, 3d, citizens of the United States, residing at Reading, in the county of Berks and State of Pennsylvania, have invented certain new and useful Improvements in Laminated Landing Wheels or the like, of which the following is a specification.

This invention relates to an improved wheel structure and more particularly to the construction of a hollow wheel such for example as the landing wheel for aeroplanes forming the subject matter of the co-pending application filed January 18, 1919, Serial No. 271,864.

One of the primary objects of the present invention is to provide a wheel of hollow construction which is light in weight, more or less resilient, and capable of withstanding severe shocks and strains without rupture of its parts. It might be presumed that a wheel of hollow construction having relatively thin sides or walls built up of wood would be liable to splinter under impact or other forces, but the present invention contemplates so constructing such a wheel that it will not be subject to disruption or splintering under the conditions stated but will on the other hand effectually withstand and absorb any shocks delivered to it, as for example impact with the ground surface when employed as a landing wheel for aeroplanes.

Another object of the invention is to so construct a wheel that while it may be in part composed of wood, the natural moisture content of the wood will be retained through the life of the wheel and on the other hand the wood will be protected from the deteriorating influences of atmospheric and sensible moisture.

Another object of the invention is to so construct the wheel that the same may be produced with a minimum waste of material and may be readily assembled and its parts united.

A further object of the invention is to so unite or join the component parts of the wheel as to provide against opening of any of the joints and so that while the wheel is hollow, it will be substantially air and water-tight thus further providing against deterioration.

In the accompanying drawings,

Figure 2 is a similar view illustrating another form of wheel;

Figure 3 is a similar view illustrating a third form of wheel.

Figure 1:
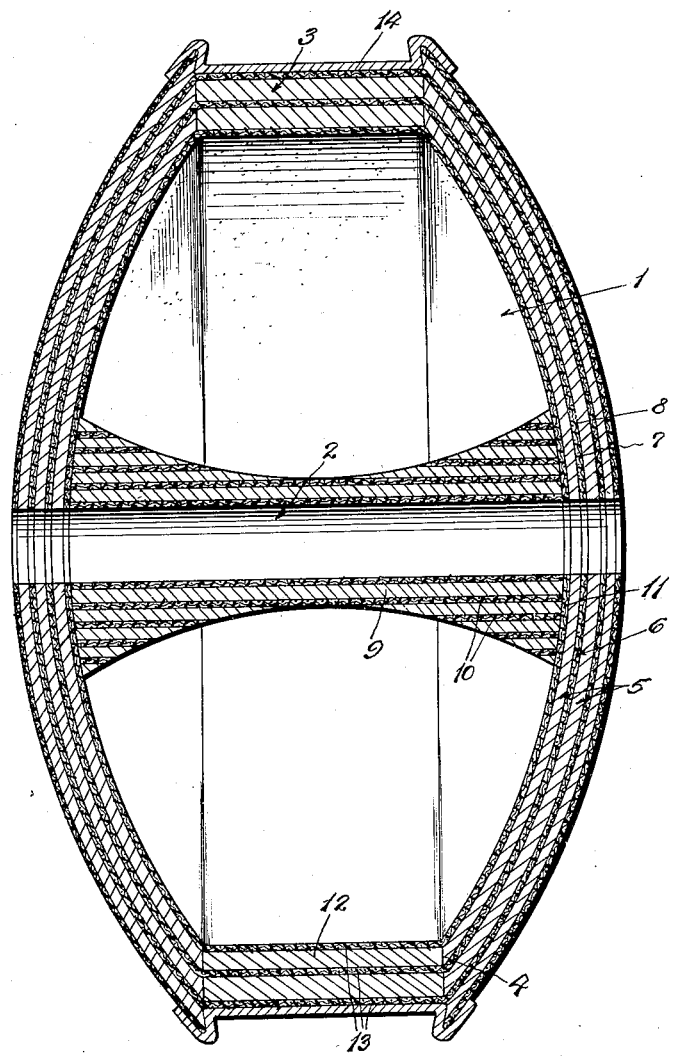
Figure 1 is a diametric sectional view through one form of wheel constructed in accordance with the invention.

While in the drawings there are illustrated three different forms of the invention, the drawings are to be taken merely as illustrating so many possible embodiments of the principles of the invention and it will be appreciated from the description which is to follow that the wheel may be made in various other forms based on the same general principle.

The material from which the wheel is chiefly made is the composite laminated structure forming the subject matter of our co-pending application filed December 24, 1920, Serial No. 432,937, and produced by the method set forth in our Patent 1,403,143 issued January 10, 1922. Briefly described, this structure comprises alternate plies of fibrous material such for example as wood either in the form of veneer or slabs and bonding plies which are of rubber or a composition of rubber and other material, the structure being produced by impregnating the wood plies with a substance which is a solvent of rubber, embedding a sheet of mesh material such for example as wire mesh, in rubber or a composition of rubber and other materials, to produce the bonding plies, and then subjecting the assembled alternately arranged plies to pressure and heat whereby to cause the solvent to take up a portion of the rubber of the bonding plies and intimately incorporate the same in the wood plies. This structure possesses the advantages that it is impervious to atmospheric and sensible moisture, may be molded or shaped under pressure to assume various curved forms, may be readily worked, and is capable of effectually withstanding and absorbing any shocks to which it is subjected without liability of disrupture or splintering of its component parts which are made of wood.

In all forms of the invention illustrated in the drawings, the wheel may be considered as comprising side walls 1, a hub 2, which extends between the inner faces of the side walls, and a felly or rim 3 which is disposed between the peripheries of the said side walls, the said walls 1 being of dished or bulged form and of any appropriate degree of curvature.

In that form of the invention shown in Figure 1 of the drawings, each side wall is formed from a circular piece or slab of the material or structure above described, and is preferably molded under pressure to the required concavo-convex shape, its periphery being beveled, as indicated by the numeral 4 so that the peripheral faces of the side walls 1 face each other in parallel planes. Thus in the drawings the numeral 5 indicates the wood or veneer plies and the numeral 6 indicates the bonding plies each of which latter may be said to have the form of a sheet of rubber 7 in which is embedded a sheet 8 of some foraminous material such for example as wire mesh, the plies 5 and 6 being intimately joined or united in the manner above pointed out. The hub 2 is likewise built up of a number of wood plies 9 and bonding plies 10 and the hub may have the shape shown in the figures of the drawings or any other desired shape. Also in producing the hub the plies may be spirally formed to build up the hub structure, or a suitable number of plies may be united to produce a block which may then be turned down to the required shape. The sides 1 are disposed, in the completed structure, with their concave faces presented toward each other, and in order to effect a firm union between the said side walls and the hub, the ends of the hub are rounded or convexed as indicated by the numeral 11 so as to conform to the curvature of the inner faces of the said side walls 1, the ends of the hub being disposed in contact with and permanently united to the said faces of the side walls as for example during the process of vulcanization set forth above or in a supplemental process which would involve the arrangement of the component parts of the wheel within a mold whereby external pressure might be exerted and the establishment within the hollow wheel body, in any convenient manner, of an expanding pressure of sufficiently high degree. The felly or rim 3 of the wheel is of the annular form shown in Figure 1 and is disposed between the peripheral faces 4 of the side walls 1 with its edges contacting the side faces, and preferably in assembling the component parts of the wheel, the bonding plies 6 or at least the edge portions of these plies will be carried into the rim or felly 3 between the wood plies thereof, the said wood plies being indicated by the numeral 12 and the bonding plies by the numeral 13. In this manner, that is to say, by making the bonding plies 6 and 13 more or less continuous one with another, a more secure union is effected between the side walls 1 and the rim or felly 3, and likewise an air and water-tight joint is produced between these parts. If desired, a metallic rim or felly band 14 may be applied to the periphery of the wheel body produced in the manner above stated, and in fact this band may initially constitute a temporary part of the mold in which the body is pressed to shape and its component parts united.

In that form of the invention shown in Figure 2 of the drawings, the side walls of the wheel are indicated in general by the numeral 15 and are of the same form as the side walls 1 previously described, comprising wood plies 16 and bonding plies 17. In this form the hub of the wheel is indicated by the numeral 18 and the rim or felly by the numeral 19 and these parts may be of the same general form as the corresponding parts 2 and 3 of the first described wheel. However, in building up the hub 2 and felly 3 in the first described form, the component plies of the parts are parallel to the axes of the parts whereas in the structure shown in Figure 2 the component parts of the hub 18 and felly 19 are disposed in planes at right angles to and intersecting the axes of the respective parts. Thus in Figure 2 the wood plies of the hub are indicated by the numeral 20 and the bonding plies by the numeral 21, the hub being built up by assembling a suitable number of these plies and then turning down the peripheral portions thereof until the required shape is obtained. Preferably in this form, in order to more effectually protect the edges of the wood plies 20 and prevent the loss of the moisture content thereof and at the same time provide against the absorption of moisture, a covering or sheath 22 of the same composition as the bonding plies is preferably arranged to envelop the hub and to extend, as at 23, partly over the inner faces of the side walls 15 of the wheel.

The wood plies of the felly are indicated by the numeral 24 and the bonding plies by the numeral 25 and it is preferable that these latter plies have edge portions 25 arranged to project beyond the inner and outer peripheries of the associated wood plies 24, these projecting edge portions being turned to overlie the side edges or peripheries of the said wood plies.

If desired this form of wheel may be provided with a metallic rim 27, and by reference to Figure 2 it will be observed that the plies 16 and 17 are so arranged that each side wall 15 will have a facing of one of the plies 17. It will also be observed that the plies 17 which cover the outer faces of the walls 15 have their peripheral portions projecting beyond the true peripheries of the side walls, and these projecting peripheral portions of the said plies 17 are led to extend as at 28 over the outer surface of the felly 19 and between the surface and the rim 27, if this rim is employed. Likewise the peripheral portions of the plies 17 covering the inner faces of the walls 15, are extended beyond the true peripheries of the said walls and are led as at 29 over the inner surface of the felly 19 with their edges, if desired, overlapped as indicated by the numeral 30. Thus by the arrangement of the plies 17 and the sheath 22, all edge portions of the component wood parts of the wheel are covered and thus effectually protected for the purposes above pointed out.

Referring now to Figure 3 of the drawings which illustrates a further embodiment of the invention, the numeral 31 indicates the side walls of the wheel, the numeral 32 the hub, and the numeral 33 the felly. In this structure the hub and felly are built up in the same manner as the hub 18 and felly 19 in the last described form of the invention, and the same principle is followed in constructing the side walls 31 of the wheel. In other words the entire body of the wheel comprising the side walls 31, the hub 32, and the felly 33, is built up of alternate plies 34 of wood or veneer and bonding plies 35 such as those previously described so that all of the plies occupy planes parallel to one another and at right angles to the axis as a whole. In this structure as in the structure shown in Figure 2, the plies 35 which extend over the outer faces of the sides 31 of the wheel have projecting marginal portions 36 which are led over the outer surface of the felly 33 and between this surface and a metallic rim 37 in the event such a rim is employed. Also in this structure a more or less continuous lining or sheath 38 of the same material as the bonding plies is arranged to envelope the hub 32 as indicated by the numeral 39, to cover the inner faces of the side walls 31 as indicated by the numeral 40, and to cover the inner surface of the felly 33 as indicated by the numeral 41.

Having thus described the invention, what is claimed as new is:

1. A wheel comprising a hub, a felly, and side walls united at their central portions to the ends of the hub and at their peripheral portions to the opposite sides of the felly, the said component parts of the wheel being made up of plies of fibrous material and bonding plies.

2. A wheel comprising a hub, a felly, and side walls united at their central portions to the ends of the hub and at their peripheral portions to the opposite sides of the felly, the said component parts of the wheel being made up of plies of fibrous material and bonding plies, and the bonding plies of one of said parts entering between the fibrous plies of another part.

3. A wheel comprising a hub, a felly, and side walls united at their peripheral portions to the opposite sides of the felly, the said felly and side walls being made up of plies of fibrous material and bonding plies, certain of the bonding plies of one of said parts extending and united to another part.

4. A wheel comprising a felly and side walls united at their peripheral portions to the opposite sides of the felly, the said felly and side walls being made up of plies of fibrous material and bonding plies, and the bonding plies of said walls extending between the fibrous plies of the felly.

5. A wheel comprising a felly and side walls united at their peripheral portions to the opposite sides of the felly, said felly and side walls being made up of plies of fibrous material and bonding plies, the bonding plies of the said parts being substantially continuous with each other.

6. A wheel comprising a felly and side walls united at their peripheral portions to the opposite sides of the felly, the said side walls and felly being of a laminated structure, and one of the laminae being of a water-proof composition and extending over surfaces of the side walls and a surface of the felly.

7. A wheel comprising a felly and side walls united at their peripheral portions to the opposite sides of the felly, the said side walls and felly being of a laminated structure, and one of the laminae being of a water-proof composition and extending over the inner surfaces of the side walls and over the inner surface of the felly.

8. A wheel comprising a felly and side walls united at their peripheral portions to the opposite sides of the felly, the said felly and side walls being made up of plies of fibrous material and bonding plies of moisture-resisting material, certain of the last-mentioned plies extending over the line of juncture of the parts whereby to seal the joint therebetween.

In testimony whereof we affix our signatures.

HARRY N. ATWOOD.
GEORGE B. BAINS, 3d.